Aug. 23, 1960    T. LINDSTROM ET AL    2,949,989
ELECTRO-MECHANICAL BRAKE DEVICE AND CONTROL CIRCUIT
Filed Nov. 25, 1957

INVENTORS
TURE LINDSTROM
ALEXANDER S. NAGY
BY
ATTORNEYS

United States Patent Office 2,949,989
Patented Aug. 23, 1960

2,949,989

ELECTRO-MECHANICAL BRAKE DEVICE AND CONTROL CIRCUIT

Ture Lindstrom, Glen Burnie, and Alexander S. Nagy, Linthicum, Md., assignors, by mesne assignments, to the United States of America as represented by the Secretary of the Navy Filed Nov. 25, 1957, Ser. No. 698,881

1 Claim. (Cl. 192—2)

The present invention relates to electro-mechanical brake devices and more particularly to electro-mechanical brake devices wherein operation of the drive member is delayed until after the brake member has started to move to release the drive member.

In certain known installations brakes are used for locking a movable member in a particular position, such as to lock a gun turret in stow position. These installations use an electromagnetically operated brake to lock the movable member, but fail to provide a system which will prevent the application of power to the movable member while the brake is engaged. If power is applied to the movable member before the brake is disengaged, damage to the brake dogs will occur as the brake members are separated.

Therefore, an object of the present invention is the provision of a novel circuit which will prevent the application of power to the movable member of a brake while the brake is engaged.

Another object is to provide a novel circuit which will prevent damage to the brake members as they are separated.

Other objects and many of the attendant advantages of this invention will be readily appreciated as the same becomes better understood by reference to the following detailed description when considered in connection with the accompanying drawings wherein.

Figure 1:
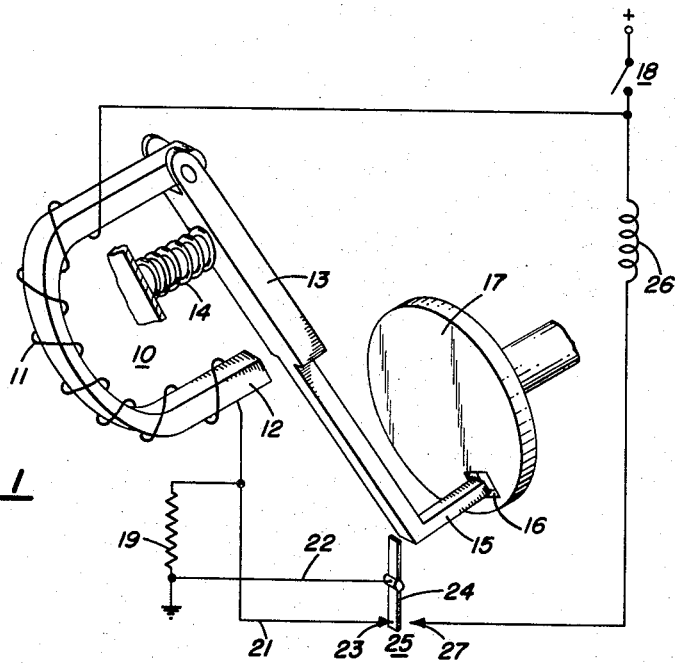
Fig. 1 is a schematic diagram of a preferred embodiment of the invention.

Referring now to the drawings, wherein like reference characters designate like or corresponding elements throughout the several views, there is shown in Fig. 1 a brake disengaging circuit comprising a brake magnet 10 having a winding 11, core 12, armature 13 and resetting spring 14. Attached to the armature 13 is a brake member 15 which is received in the slotted portion 16 of the brake plate 17.

One end of winding 11 is connected to the positive terminal of a direct current source through switch 18. The other end of winding 11 is connected to ground through two circuits. One of the circuits comprises resistor 19 and the other circuit comprises conductor 21, terminal 23 and armature 24 of switch 25 and conductor 22. Another circuit comprises switch 18, winding 26 of a hydraulic control valve (not shown) terminal 27 and armature 24 of switch 25 and conductor 22. Switch 25 is in the position shown when winding 11 is deenergized and the brake is engaged.

When it is desired to place the system in operation, switch 18 is closed allowing current to flow through winding 11, conductor 21, terminal 23, armature 24 and conductor 22 to ground. This causes armature 13 to be attracted to core 12 which will disengage member 15 from slot 16 of brake plate 17. Member 15 in its motion to disengage slot 16 will snap over armature 24 of micro switch 25. An energizing circuit is then provided for winding 26 through terminal 27, armature 24 and conductor 22 to ground. A holding circuit for electromagnet 10 is provided through resistor 19 to ground. Brake member 15 will be held in a disengaged position and brake plate 17 will be free to rotate.

Figure 2:
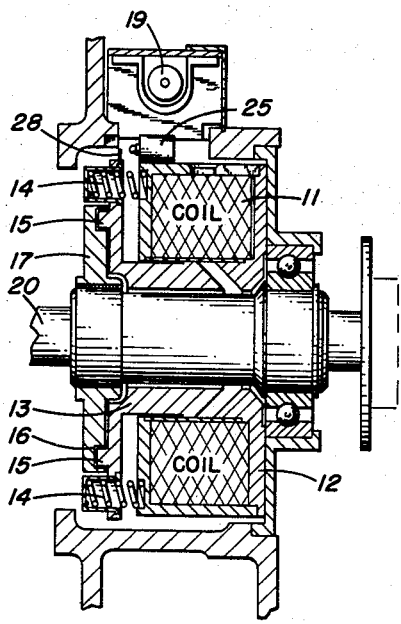
Fig. 2 shows a brake assembly embodying the invention.

In Fig. 2 the same reference numerals are used to indicate the same parts shown in the schematic diagram of Fig. 1. Brake plate 17 is attached to drive shaft 20 and has slots 16 which will receive dogs 15 when the turret is in the stow or locked position. Dogs 15 are held in this position by means of springs 14. When coil 11 is energized a magnetic force acts on armature 13 against springs 14 to disengage dog 15 from slot 16. As dog 15 is disengaged from slot 16, the portion 28 of armature 13 will engage micro switch 25 thus causing it to snap over and energize winding 26 (shown in Fig. 1).

Obviously many modifications and variations of the present invention are possible in the light of the above teachings. It is therefore to be understood that within the scope of the appended claim the invention may be practiced otherwise than as specifically described.

What is claimed is:

A protective system for gun turrets comprising a first brake element and a second brake element, said first brake element having a recessed portion for receiving a dog member mounted on said second brake element, said second brake element being axially movable, spring means yieldingly urging said brake element toward said first brake element for engaging said dog member with said recessed portion, electro-magnetic actuating means for separating said dog member from said recessed portion, circuit means including control means and said electro-magnetic actuating means, switch means in said circuit means in juxtaposition to said second brake element having first and second positions, the first position of said switch means providing a circuit for energizing said electro-magnetic actuating means, the second position of said switch means providing a circuit for energizing said control means, said switch means being engaged and snapped from said first position to said second position when said second brake element moves sufficiently in a direction to separate said dog member from the recessed portion of said first brake element, thereby preventing said control circuit means for being energized until after said brake elements are separated.

References Cited in the file of this patent

UNITED STATES PATENTS

| | | |
|---|---|---|
| 1,474,447 | Schroeder | Nov. 20, 1923 |
| 1,546,354 | Tuppen | July 14, 1925 |
| 2,214,807 | Buckley | Sept. 17, 1940 |
| 2,671,880 | Symonds | Mar. 9, 1954 |
| 2,724,474 | Hupp | Nov. 22, 1955 |

UNITED STATES PATENT OFFICE
CERTIFICATE OF CORRECTION

Patent No. 2,949,989                                          August 23, 1960

Ture Lindstrom et al.

It is hereby certified that error appears in the printed specification of the above numbered patent requiring correction and that the said Letters Patent should read as corrected below.

Column 2, line 36, after "said", first occurrence, insert -- second --.

Signed and sealed this 11th day of April 1961.

(SEAL)
Attest:
ERNEST W. SWIDER

Attesting Officer

ARTHUR W. CROCKER
Acting Commissioner of Patents